(12) United States Patent
Mao et al.

(10) Patent No.: US 10,498,866 B2
(45) Date of Patent: Dec. 3, 2019

(54) METHODS AND SYSTEMS FOR DELIVERING CONTENT

(71) Applicant: Comcast Cable Communications, LLC, Philadelphia, PA (US)

(72) Inventors: Weidong Mao, West Windsor, NJ (US); Mark Francisco, Clarksburg, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/618,596

(22) Filed: Feb. 10, 2015

(65) Prior Publication Data

US 2016/0234348 A1 Aug. 11, 2016

(51) Int. Cl.
*H04L 29/06* (2006.01)
*H04L 27/34* (2006.01)

(52) U.S. Cl.
CPC .............. *H04L 69/08* (2013.01); *H04L 27/34* (2013.01); *H04L 63/0428* (2013.01)

(58) Field of Classification Search
CPC ............................ H04L 69/08; H04L 63/0428
See application file for complete search history.

(56) References Cited

U.S. PATENT DOCUMENTS

| | | | | |
|---|---|---|---|---|
| 6,557,031 B1 * | 4/2003 | Mimura | ................... | H04L 29/06 375/E7.025 |
| 8,909,766 B1 * | 12/2014 | Hegg | ....................... | H04L 41/08 709/224 |
| 9,143,808 B2 * | 9/2015 | Healy | ..................... | H04N 21/23 |
| 9,344,319 B1 * | 5/2016 | Harrington | ............. | H04L 27/34 |
| 2002/0026645 A1 * | 2/2002 | Son | ...................... | H04L 12/2801 725/117 |
| 2004/0267602 A1 * | 12/2004 | Gaydos | .............. | H04N 7/17336 709/200 |
| 2008/0141317 A1 * | 6/2008 | Radloff | .............. | H04N 5/44582 725/87 |
| 2008/0151881 A1 * | 6/2008 | Liu | ........................ | H04L 1/0002 370/389 |
| 2009/0028192 A1 * | 1/2009 | Rieger | ................... | H04H 20/42 370/535 |
| 2009/0249421 A1 * | 10/2009 | Liu | ..................... | H04L 12/2801 725/116 |
| 2009/0310480 A1 * | 12/2009 | Bao | ..................... | H04L 12/2801 370/217 |
| 2009/0310596 A1 * | 12/2009 | Joyce | .................. | H04L 12/2801 370/352 |
| 2010/0011397 A1 * | 1/2010 | Baran | ............... | H04L 29/06027 725/90 |
| 2010/0023977 A1 * | 1/2010 | Peterfreund | ......... | H04N 7/1675 725/87 |
| 2011/0010741 A1 * | 1/2011 | Liao | ................... | H04N 7/17318 725/51 |

(Continued)

*Primary Examiner* — Saleh Najjar
*Assistant Examiner* — Devin E Almeida
(74) *Attorney, Agent, or Firm* — Ballard Spahr LLP

(57) ABSTRACT

Methods and systems for delivering content are disclosed. An example method can comprise receiving, at a gateway device located at a user network, packetized data asset via a packet switched network. The gateway device can convert the packetized data asset to a non-packetized data asset, and transmit the non-packetized data asset via a non-packet switched network to a computing device.

20 Claims, 7 Drawing Sheets

(56) References Cited

U.S. PATENT DOCUMENTS

| | | | |
|---|---|---|---|
| 2011/0035772 A1* | 2/2011 | Ramsdell | H04H 20/103 725/36 |
| 2011/0138064 A1* | 6/2011 | Rieger | G06F 17/30905 709/228 |
| 2011/0271313 A1* | 11/2011 | Urban | H04L 12/2861 725/109 |
| 2013/0198796 A1* | 8/2013 | Brooks | H04L 12/2898 725/129 |
| 2014/0089448 A1* | 3/2014 | Geffner | H04L 67/2842 709/213 |
| 2014/0164760 A1* | 6/2014 | Hybertson | H04N 21/4402 713/153 |

* cited by examiner

METHODS AND SYSTEMS FOR DELIVERING CONTENT

BACKGROUND

Content can be accessed via a device that can access a communication channel, protocol, or medium transmitting the content. However, content transmitted via a particular channel, protocol, or medium cannot be accessed by a device without the capability to access that particular channel, protocol, or medium. For example, a device without the capability to access an internet protocol (IP) channel cannot access the content offered via, the IP channel. These and other shortcomings are addressed by the present disclosure.

SUMMARY

It is to be understood that both the following general description and the following detailed description are exemplary and explanatory only and are not restrictive. Methods and systems for delivering and accessing content are disclosed. In one aspect, a gateway device located at a user network (e.g., a local area network at a user premises), for example, can receive a packetized data asset via a packet switched network (e.g., networks using the Transmission Control Protocol and Internet Protocol (TCP/IP) protocol suite, also known as IP networks). The gateway device can convert the packetized data asset to a non-packetized data asset, and transmit the non-packetized data asset via a non-packet switched network to a computing device.

In an aspect, an example method can comprise a gateway device, located at a user network, receiving a packetized data asset via a packet switched network. The gateway device can convert, the packetized data asset to a non-packetized data asset, and transmit the non-packetized data asset via a non-packet switched network to a computing device. The transmission of the non-packetized data asset can be based on a device identifier associated with the computing device.

An example method can comprise a gateway device receiving a first request for a particular data asset. The gateway device can transmit a second request for service to a content provider, based on the first request. In turn, the gateway device can receive the requested data asset via a packet switched network in response to the second request for service, and generate a non-packetized data asset based on the received data asset. The gateway device can transmit the non-packetized data asset via a non-packet switched network to a computing device.

In another aspect, an example method can comprise a content provider receiving a request for a data asset. The content provider can determine a packetized data asset based on the request, and transmit the packetized data asset to a gateway device located at a user network via a packet switched network. The gateway device can be configured to convert the packetized data asset to a non-packetized data asset to facilitate transmission via anon-packet switched network.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
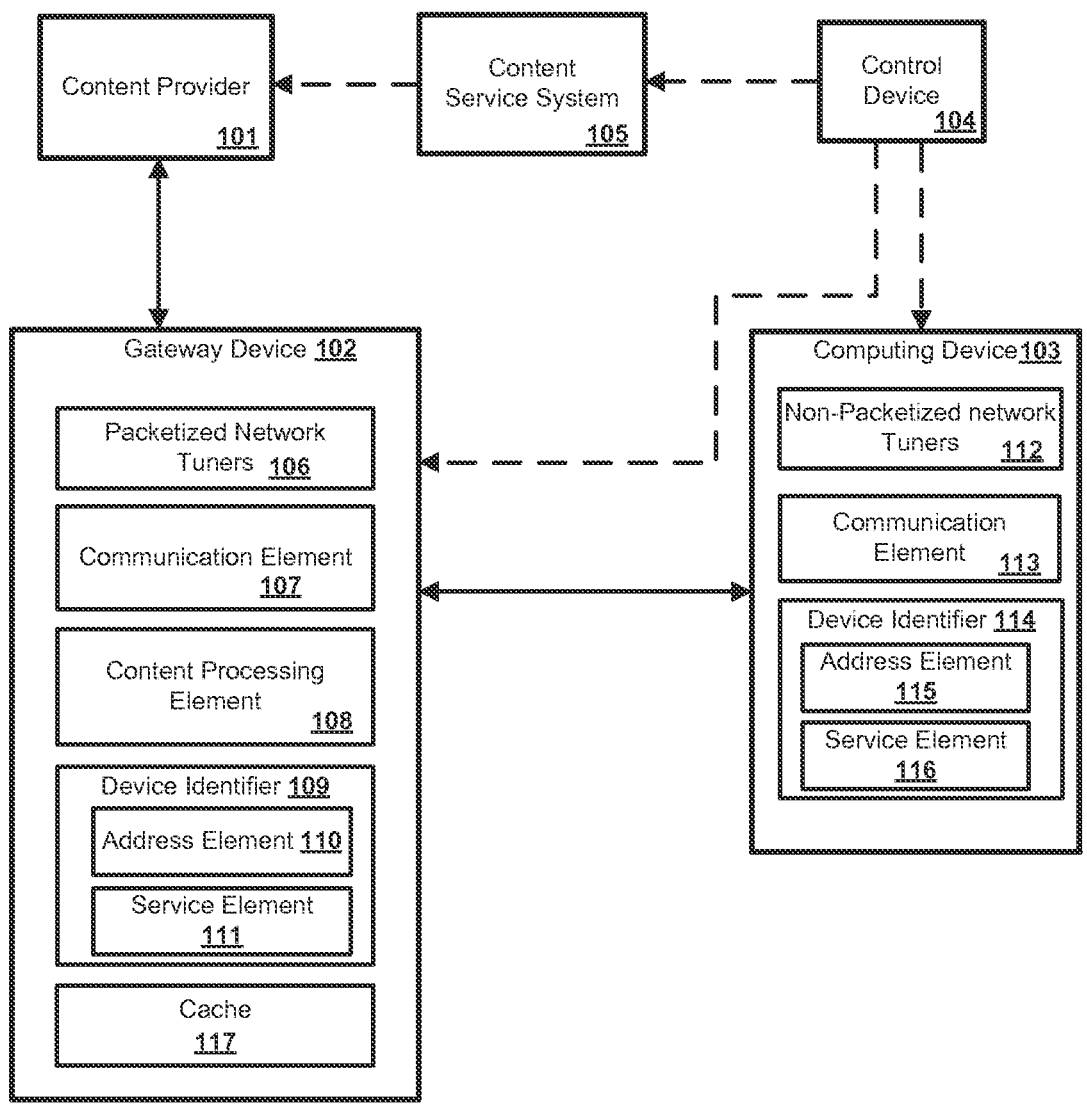
FIG. 1 illustrates various aspects of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Methods and systems for tuning content are disclosed. A gateway device located at a user network (e.g., a local area network at a user premises), for example, can receive a packetized data asset via a packet switched network. The gateway device can convert the packetized data asset to a non-packetized data asset, and transmit the non-packetized data asset via a non-packet switched network to a computing device. The transmission of the non-packetized data asset can be based on a device identifier associated with the computing device. In an aspect, a packetized data asset can be transmitted from a content provider to the computing device in response to a request for service. The request for service can be initiated on a control device, and received via the gateway device, the computing device, or a content service system.

FIG. 1 illustrates various aspects of an exemplary system 100 in which the present methods and systems can operate. In an aspect, the system 100 can comprise a content provider 101 or any other source. The content provider 101 can provide content (e.g., packetized data assets) to a gateway device 102 via a packet switched network (e.g., an IP network). The content provider 101 can retrieve and, if needed, combine content from multiple sources and can distribute content to user (e.g., subscriber) locations via a distribution system. There can be a multitude of user locations connected to the distribution system. The communications distributed by the content provider 101 can include a single content item or a multiplex that includes several content items. In an aspect, the content provider 101 can carry pay per view or video on demand service. As an example, a tuner on the gateway device 102 can tune to a particular channel offered by the content provider 101. The content provider 101 can transmit content via multicast and/or unicast transmissions to the gateway device 102.

In an aspect, the system 100 can comprise a gateway device 102 capable of tuning to specific content (e.g., a packetized data asset) provided by the content provider 101 via a packet switched network (e.g., IP network). The gateway device 102 or another device downstream of the gateway device 102 can convert the specific content (e.g., a packetized data asset) received from the content provider 101 to a non-packetized data asset, and transmit the non-packetized data asset to a computing device 103 via a non-packet switched network (e.g., a QAM network). As an example, the gateway device 102 can comprise or transmit the data asset to a headless gateway system (e.g., a gateway system that does not perform video rendering), a network device, a communication terminal, and/or the like. In an aspect, the gateway device 102 does not need to be in a fixed location. It can be deployed in any location convenient to communicate with the content provider 101, the computing device 103, and a control device 104. In an aspect, the gateway device 102 can receive a request for specific content (e.g., a first request for service) directly from the control device 104 or via the computing device 103. The gateway device 103 can access the specific content provided by the content provider 101 by transmitting a second request for service to the content provider in response to receiving a request for the specific content (e.g., a first request for service).

In an aspect, the gateway device 102 can comprise one or more packet switched network tuners 106. As an example, one or more packet switched network tuners 106 can comprise internet protocol (IP) tuners. The one or more packet switched network tuners 106 can receive content signal from content provider 101 via a packet switched network (e.g., IP network).

In an aspect, the gateway device 102 can comprise a communication element 107. The communication element 107 can control communications between the gateway device 102 and other devices and systems, such as the computing device 103, the control device 104. For example, the communication element 113 can receive a request for a data asset from the control device 104. As another example, the communication element 107 can receive a request for a data asset (e.g., a first request for a data asset) from the computing device 103 via, for example, via an out of band (OOB) communication path of the non-packet switched network. As another example, the communication element 107 can transmit a request for a data asset (e.g., a second request for a data asset) to the content provider 101. As an example, communication element 107 can comprise software, hardware, and/or interfaces for presenting and/or receiving information, such as request for a data asset (e.g., specific content). As an example, the communication element 107 can request or query various files from a local source and/or a remote source. As a further example, the communication element 107 can transmit data to a local or remote device such as the computing device 103. Specifically, the communication element 107 can control communications to and from a client (e.g., QAM client) implemented on the computing device 103 using the client's native OOB communications protocol and modulation method (e.g., QPSK).

In an aspect, the gateway device 102 can comprise a content processing element 108. Alternatively, the content processing element 108 can be a separate device disposed downstream of the gateway 102. In an aspect, the content processing element 108 can be configured to receive content (e.g., a packetized data asset) from content provider 101. In an aspect, the content processing element 108 can combine a plurality packetized data assets and cache sufficient quantity of packetized data assets to ensure a continuous streaming source. The content processing element 108 can convert the received packetized data asset to a non-packetized data asset by forming the packetized information as a continuous stream. As an example, data can be converted to a QAM representation by modulating two carrier waves based upon the digital data received. Modulation can comprise, for example, modification of the phase and/or the amplitude of each of the carrier waves. If the non-packetized data asset is encrypted, the content processing element 108 can be configured to convert encryption of the received packetized data asset (e.g., IP packets) to a conditional access security required by the computing device 103 (e.g., a QAM enabled set top box). In an aspect, the content processing element 108 can be configured to defragment the received packetized data asset and the defragmented packetized data asset can be formed as a continuous stream prior to a modulation process (e.g., QAM modulation process). In another aspect, the content processing element 108 can convert (e.g., transcode) content encoded with a codec of the received packetized data asset to content encoded with a codec of the non-packetized data asset, for example, content encoded with H.264 codec can be transcoded to MPEG-2 content codec.

In an aspect, the content processing element 108 can comprise one or more modulators to modulate the converted non-packetized data asset according to a modulation technique (e.g., quadrature amplitude modulation (QAM)). QAM is a modulation scheme that conveys data using two carrier signals (e.g., two analog message signals or two digital bit streams) by modulating amplitudes of the two carrier signals. Each QAM channel can be multiplexed to transmit multiple data assets simultaneously. Accordingly, the content processing element 108 can multiplex a plurality of converted non-packetized data assets in a single channel (e.g., a QAM channel), and transmit the plurality of non-packetized data assets to a plurality of computing devices 103. For example, a home can have four computing devices (e.g., display devices) 103 requesting four unique data assets, and a modulator can be capable of multiplexing two requested non-packetized data assets per QAM channel, so that two QAM channels are needed to provide the four unique data assets. Alternatively, four QAM channels can be used to provide the four unique data assets to the four computing devices. Each of the computing devices 103 can be assigned a QAM channel for a particular session, and any data asset requested by the particular computing device 103 can be carried to the particular computing device 103 on the assigned QAM channel. The gateway device 102 can transmit a message to each of the computing devices 103 to assigning a respective session QAM channel to which the computing device 103 should be tuned to in order to receive the respective requested data assets if a QAM channel is multiplexed so that computing devices 103 can receive independent data assets through the same QAM channel, the gateway 102 can further provide a program identifier to each of the computing devices 103. In an aspect, the respective QAM channel and the program identifier associated with each computing device 103 can remain static for at least the duration of a session. In such a scenario, the gateway device 102 can comprise multiple (e.g., two) modulators to support transmitting four requested data assets to four computing devices 103.

In an aspect, the gateway device 102 can be associated with one or more respective user identifiers or device identifiers 109. As an example, the device identifier 109 can be any identifier, token, character, string, or the like, for differentiating one user or device from another user or device. In a further aspect, the device identifier 109 can identify a user or user device as belonging to a particular class of users or user devices. As a further example, the device identifier 109 can comprise information relating to the user device such as a manufacturer, a model or type of device, a service provider associated with the gateway device 102, a state of the gateway device 102, a locator, and/or a label or classifier. Other information can be represented by the device identifier 109.

In an aspect, the one or more device identifiers 109 can comprise an address element 110 and a service element 111. In an aspect, the address element 110 can comprise or provide an internet protocol address, a network address, a media access control (MAC) address, an Internet address, or the like. As an example, the address element 110 can be relied upon to establish a communication session between the gateway device 102 and other network devices and systems, such as the content provider 101, the computing device 103, and the control device 104. As a further example, the address element 110 can be used as an identifier or locator of the gateway device 102. In an aspect, the address element 110 can be persistent for a particular network.

In an aspect, the service element 111 can comprise an identification of a service, service type, service level, and/or service provider associated with the respective device and/or with the class of gateway device 102. As examples, the service can indicate the type of content provided (e.g., video). The service type can comprise connection details of a connection between the gateway device 102 and the content provider 101 (e.g., available bandwidth). The service level can indicate available bandwidth available to the gateway device 102. The class of the device can be related to a type of device, capability of device, type of service being provided, and/or a level of service (e.g., business class, service tier, service package, etc.). As an example, the service element 111 can comprise information relating to or provided by a communication service provider (e.g., the content provider 101) that is providing or enabling data flow such as communication services to the respective device. As a further example, the service element 111 can comprise information relating to a preferred service provider for one or more particular services relating to the respective device. In an aspect, the address element 110 can be used to identify or retrieve data from the service element 111, or vice versa. As an example, service element 111 can comprise identification of a content provider to which a specific user or device is entitled to access. As another example, service element 111 can comprise identification of content type, for example, pay per view content or video on demand content. In an aspect, the service element 111 can be used to indicate the content provider 101 from which a data asset has been requested.

In an aspect, the gateway device 102 can further comprise a cache 117. In an aspect, the cache 117 can be integral to the gateway device 102. Alternatively, the cache 117 can be external to and in functional communication with the gateway device 102.

In an aspect, the system 100 can comprise a computing device 103. The computing device 103 can be a device or system not capable of receiving (e.g., tuning to) specific content directly from the content provider 101. In an aspect, the computing device 103 can receive specific content via the gateway device 102, which, in turn, can tune to the content provider 101 for specific content. As an example, computing device 103 can comprise a set top box, a consumer electronic device, a smart phone, a computer, a tablet, a mobile device, a PDA, a smart TV set, an entertainment system, a communications terminal, and the like. The computing device 103 can receive a request for a data asset from the control device 104 (e.g., a remote control device associated with the computing device 103), and transmit the request for the data asset to the gateway device 102. In another aspect, the computing device 103 can transmit the request for the data asset to the gateway device 102. In an aspect, computing device 103 does not need to be in a fixed location. It can be deployed in any location convenient to communication with the control device 104 and/or the gateway device 102.

In an aspect, the computing device 103 can comprise one or more non-packet switched network (e.g., QAM) tuners 112. In an aspect, one or more non-packet switched network (e.g., QAM) tuners 112 can access a non-packet switched network (e.g., a QAM network). For example, one or more non-packet switched network (e.g., QAM) tuners 112 can comprise quadrature amplitude modulation (QAM) tuners.

In an aspect, the computing device 103 can comprise communication element 113. The communication element 113 can control communications between the computing device 103 and other network devices and systems, such as the gateway device 102 and the control device 104. For example, the communication element 113 can receive a request for a data asset from the control device 104. As another example, the communication element 113 can receive a request a data asset (e.g., first request for a data asset) from the control device 104 via, for example, a) wired and/or wireless network using infrared frequency, radio frequency, Wi-Fi, Bluetooth, MoCa, DLNA, Ethernet or any desired method or standard. Alternatively, the computing device 103 can receive a request for a data asset directly from a user. As an example, communication element 113 can comprise software, hardware, and/or interfaces for presenting and/or receiving information. As an example, the communication element 113 can request or query various files from a local source and/or a remote source. As another example, the communication element 113 can transmit a request for a data asset (e.g., first request for a data asset) to the gateway device 102.

In an aspect, the computing device 103 can be associated with a respective user identifier or device identifier 114. As an example, the device identifier 114 can be any identifier, token, character, string, or the like, for differentiating one user or device from another user or device. In a further aspect, the device identifier 114 can identify a user or user device as belonging to a particular class of users or user devices. As a further example, the device identifier 114 can comprise information relating to the user device such as a manufacturer, a model or type of device, a service provider associated with the computing device 103, a state of the computing device 103, a locator, and/or a label or classifier. Other information can be represented by the device identifier 114.

In an aspect, the device identifier 114 can comprise an address element 115 and a service element 116. In an aspect, the address element 115 can comprise or provide an internet protocol address, a network address, a media access control (MAC) address, an Internet address, or the like. As an example, the address element 115 can be relied upon to establish a communication session between the computing device 103 and other network devices and systems, such as the gateway device 102 and the control device 104. As a further example, the address element 115 can be used as an identifier or locator of the computing device 103. In an aspect, the address element 115 can be persistent for a particular network.

In an aspect, the service element 116 can comprise an identification of a service provider associated with the respective device and/or with the class of computing device 103. The class of the device can be related to a type of device, capability of device, type of service being provided, and/or a level of service (e.g., business class, service tier, service package, etc.). As an example, the service element 116 can comprise information relating to or provided by a communication service provider (e.g., content provider) that is providing or enabling data flow such as communication services to the respective device. As a further example, the service element 116 can comprise information relating to a preferred service provider for one or more particular services relating to the respective device. In an aspect, the address element 115 can be used to identify or retrieve data from the service element 116, or vice versa. As an example, service element 116 can comprise identification of a content provider to which a specific user or device is entitled to access. As another example, service element 116 can comprise identification of content type, for example, pay per view content or video on demand content.

In an aspect, the system 100 can comprise a control device 104. The control device 104 can be a device capable of communicating with gateway device 102, the computing device 103, a content service system 105, or combination thereof. In an aspect, the control device 104 can communicate with the gateway device 102 and/or computing device 103 via infrared frequency and/or radio frequency communication mechanism. In another aspect, the control device 104 can communicate with the content service system 105 via an internet protocol. As an example, the control device 104 can comprise a programmable consumer electronic device, a smart phone, a remote control, a computer, a tablet, a mobile device, a PDA, a gaming console, and/or any similar device capable of interfacing with the gateway device 102, the computing device 103, and/or the content service system 105. In an aspect, the control device 104 can serve as a remote control associated with the computing device 103. In an aspect, an application can be implemented on the control device 104 for a user to input a request for a data asset (e.g., selecting a content item, a channel, etc.). The user can also designate a specific computing device 103 to receive the requested data asset. Alternatively, the requested data asset can be transmitted to an authorized computing device 103 associated with the user.

In an aspect, the system 100 can comprise a content service system 105. In an aspect, the content service system 105 can enable the control device 104 or the computing device 103 to interact with remote resources such as data, devices, and files, for example, the content provider 101. As an example, content service system 105 can comprise a web application, a server, router, network computer, peer device, other common network node, and the like. In an aspect, the content service system 105 can communicate with the control device 104 or the computing device 103 via standard Internet protocols, such as hypertext transfer protocol (HTTP), simple object access protocol (SOAP), universal description, discovery and integration (UDDI), etc. As an example, the control device 104 or the computing device 103 can transmit a request for a data asset to the content provider 101 via the content service system 105. Upon receiving the request for the data asset, the content provider 101 can transmit the requested data asset to the computing device 103 via the gateway device 102.

Figure 2:
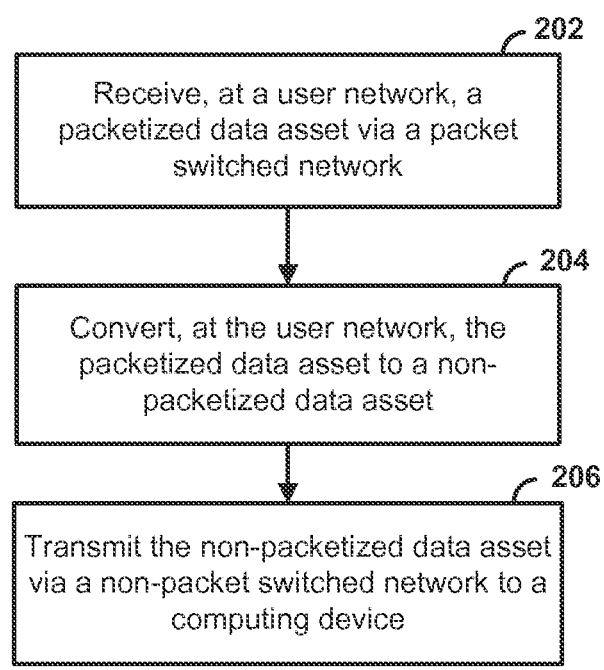
FIG. 2 is a flowchart illustrating an example method.

FIG. 2 is a flowchart illustrating an example method. At step 202, a packetized data asset can be transmitted (e.g., a unicast, multicast, or broadcast transmission, etc.) via a packet switched network to a user network which can be a network downstream of the gateway device 102, such as a user's private or public home network. In an aspect, the gateway device 102, located at the user network, can receive a packetized data asset from the content provider 101. The content provider 101 can transmit the packetized data asset to the gateway device 102 via a packet switched network by, for example, unicast, multicast, and/or broadcast transmission. For example, the gateway device 102 can receive the packetized data asset via joining a group multicast transmission. In an aspect, gateway device 102 can comprise a headless gateway system, a network device, a communication terminal, and/or the like. As an example, the packet switched network can comprise an internet protocol based network. The packetized data asset can comprise a plurality of units of data, such as internet protocol packets, Ethernet frames, and the like. The packetized data asset can comprise information associated with requested content or content channel.

At step 204, the packetized data asset can be converted to a non-packetized data asset at the user premises (e.g., at the user network). In an aspect, the gateway device 102 (e.g., the content processing element 108) can be configured to convert the packetized asset to a non-packetized data asset. In an aspect, the content processing element 108 can combine a plurality of packetized data assets and cache a sufficient quantity of packetized data assets to ensure a continuous streaming source. In an aspect, the packetized data asset can be encrypted, for example using a digital rights management (DRM) system. When the packetized data asset is encrypted, the gateway device 102 (e.g., content processing element 108) can be configured to convert encryption of received packetized data asset (e.g., internet protocol packets, Ethernet frames) to a conditional access security required by the computing device 103 (e.g., QAM enabled set top box).

In an aspect, the packetized data asset can be encrypted using Data Encryption Standard (DES), a fixed-key-length security algorithm that employs 56-bit length keys. Any 56-bit number can be implemented as a DES key.

In one example, the encryption can be implemented as a DES/3-DES stream engine that operates via (e.g., through, using, etc.) a legacy system Cipher Block Chaining (CBC) mode. In another example, the encryption can be implemented as a DES/3-DES stream engine that operates via an Electronic Code Book (ECB) mode, which uses a 56-bit DES in ECB mode for MPEG-2 transport security. In yet another example, the encryption can be implemented as an OpenCable (SCTE-41) Copy Protection mode stream engine that uses 56-bit DES in ECB mode for MPEG 2 transport security. The OpenCable (SCTE-41) Copy Protection also uses a variation of the CAS DFAST scrambling on DES keys, which can be calculated and sent across, for example, a CableCARD interface.

As a further example, the encryption can be implemented as an advanced encryption standard (AES) mode stream engine that uses the standard AES algorithm for transport decryption and encryption.

In another example, the encryption can be implemented as a Copy Protection/Digital Video Recorder (DVR) mode stream engine. An OpenCable (SCTE 41) Copy Protection system can be modified to support AES and existing DES encryption algorithms for the DVR and Copy Protection security. When AES is used as an algorithm, the 128-bit key can be scrambled by the DFAST algorithm. AES is generally a more secure algorithm to use when compared to DES and therefore may be preferable for at least some DVR applications.

As an additional example, the encryption can be implemented as a Common Scrambling Algorithm (CSA) stream engine. For example, the encryption can be implemented using DVB-CSA Standard Mode as implemented by vendors such as NDS and Nagravision. DVB-CSA CASs use a 40-bit CSA for MPEG-2 transport security. DVB-CSA also uses triple DES encryption for the CSA keys.

In another yet example, the encryption can be implemented as a CAS CSA mode stream engine. The CAS CSA mode can use the standard CSA algorithm for transport encryption and decryption. In one further example, the encryption can be implemented as a Digital Rights Management (DRM) digital media stream engine. The gateway device 102 can receive a DRM stream and license file using at least one standard algorithm (e.g., DES, AES, CSA, etc.) for transport encryption and decryption.

As an example, the packetized data asset can be encrypted using a DRM system. The received packetized data asset can be stored in a memory, such as the cache 117. The content processing element 108 can be configured to authenticate the received packetized data asset. For example, the content processing element can authenticate the packetized data asset by communicating with a DRM server, such as a DRM server operated by the content provider 101 or a third party DRM server. When the packetized content is authenticated, the content processing element 108 can convert the packetized data asset to a non-packetized data asset.

As a further example, the data processing element 108 can convert the non-packetized data asset to securely transmit the non-packetized data asset. For example, the data processing element 108 can encrypt the non-packetized data asset using a conditional access security system. In an aspect, the conditional access system can be used to scramble the non-packetized data asset in addition to or in place of the encryption.

In another aspect, the gateway device 102 (content processing element 108) can defragment the received packetized data asset, and form the defragmented packetized data asset as a continuous stream prior to a modulation process (e.g. QAM modulation process). For example, the gateway device 102 can store a plurality of packets that comprise the packetized data asset in a memory, such as the cache 117. Defragmenting the plurality of packets can comprise ordering the plurality of packets according to a predefined order.

For example, the plurality of packets can be ordered in the cache 117 according to the order in which the packets) were created and/or transmitted.

In another aspect, the gateway device 102 (e.g., content processing element 108) can convert (e.g., transcode) content encoded with a codec of the received packetized data asset to content encoded with a codec of the non-packetized data asset, for example, content encoded with H.264 codec can be transcoded to MPEG-2 content codec. In an aspect, the content processing element 108 comprises one or more modulators to modulate the converted non-packetized data asset according to a modulation technique (e.g., QAM). In another aspect, the content processing element 108 can perform one or more of decryption, defragmentation, transcoding, multiplexing, and modulation of the received packetized data asset. In another aspect, the content processing element 108 can select a specific video resolution and/or bit rate profiles from a packetized data set based on device capability of the computing device 103. In an aspect, the gateway device 102 (e.g., content processing element 108) can multiplex a plurality of non-packetized data assets in a single channel (e.g., QAM channel).

As an example, the gateway device 102 can receive a plurality of IP delivered media streams (e.g., video, audio, captioning data, and other content data) and convert the plurality of IP delivered media streams to a MPEG Transport Stream (TS) format. MPEG-TS can require an isochronous delivery. In an aspect, IP delivery of the data asset can be packetized (i.e., divided into a plurality of data blocks) at the rate of a delivery network. In this scenario, an IP data asset can arrive in bursts and can be formatted into a steady stream of data formatted as a non-packetized data asset transport stream. As an example, an IP delivered data asset format can comprise MPEG-DASH, Smooth Streaming, HTTP streaming, HTTP live streaming (HLS), and others that can be adapted to MPEG-TS format. The MPEG-TS stream can be converted to a non-packetized stream and modulated using QAM or a similar modulation method using a RF carrier prior to transmission to the computing device 103.

At step 206, the non-packetized data asset can be transmitted via a non-packet switched network to a computing device, based on a device identifier associated with the computing device. In an aspect, the device identifier can be transmitted to the gateway device 102 from a computing device 103 as part of a request for a data asset to begin a session. In an aspect, the device identifier can comprise, for example, a media access control (MAC) address of the computing device 103. In an aspect, the gateway device 102 assigns a channel (e.g., a QAM channel) to the computing device 103 in response to receiving the device identifier and transmits a channel identifier identifying the assigned channel to the computing device 103. In an aspect, the gateway device 102 can also assign a program identifier to the computing device 103 and can transmit the program identifier to computing device 103. The channel and program identifier can be maintained for the duration of a session. In an aspect, the gateway device 102 can transmit the non-packetized data asset to one or more computing device 103 via a non-packet switched network. The non-packetized data asset can be transmitted to one or more computing devices 103 based on device identifiers (e.g., MAC addresses) associated with the respective one or more computing devices 103. As an example, the non-packetized data asset can comprise a plurality of data streams. In an aspect, each of the plurality of data steams can be transmitted to a specific computing device 103. For example, the non-packet switched network can comprise one or more QAM networks. The computing device 103 can be assigned a particular QAM channel and program identifier, and the gateway device 102 can transmit a respective one of the data streams to the computing device 103 by transmitting the respective data stream on the assigned QAM channel. Optionally, the data stream can be further associated with the device identifier of the computing device 103. For example, one or more frames in an MPEG-2 encoded data stream can be embedded with the device identifier. As another example, QAM native out of band communication within the data stream can be used to indicate the device identifier of the computing device 103. As an example, the computing device 103 can comprise a set top box, a programmable consumer electronic device, a smart phone, a computer, a tablet, a mobile device, a PDA, a smart TV set, an entertainment system, a communications terminal, and the like. The computing device 103 can use the QAM channel identifier and/or the program identifier provided by the gateway device 102 to tune to the assigned QAM channel for display of the requested data asset.

Figure 3:
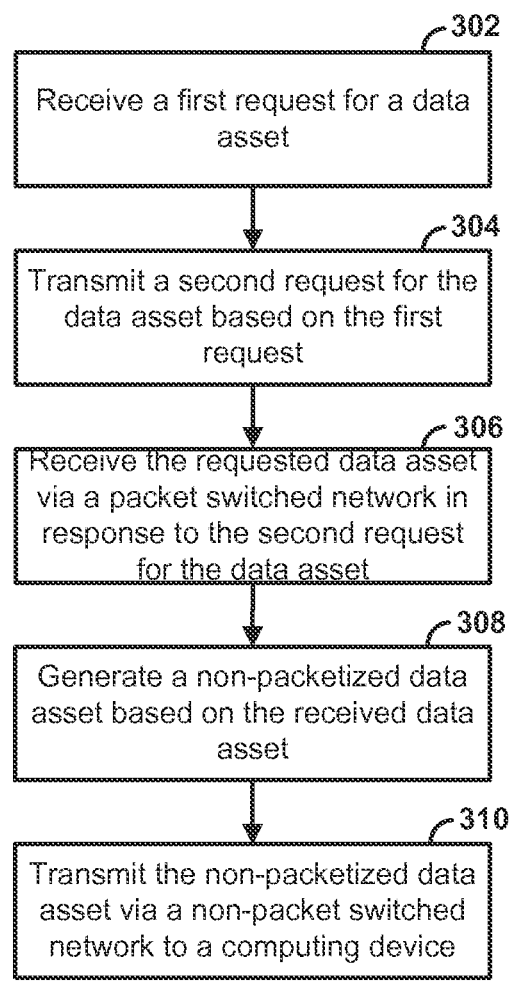
FIG. 3 is a flowchart illustrating another example method.

FIG. 3 is a flowchart illustrating another example method. At step 302, a first request for a data asset can be received. In an aspect, the first request for the data asset can comprise a request for content. For example, the request for the data asset can comprise a title of the content (e.g., title of a television program or a movie), type of content (e.g., pay per view content, video on demand content), channel information (e.g., channel 10), user account information, and/or the like. As another example, the first request for the data asset can comprise a device identifier of a device (e.g., computing device 103) to which the requested content can be transmitted. In an aspect, the gateway device 102 can receive the first request for the data asset directly from the control device 104. In another aspect, the computing device 103 can receive the first request for the data asset from the control device 104, and the computing device 103 can, in turn, transmit the first request for the data asset to the gateway device 102. As an example, the first request for the data asset can be transmitted from the computing device 103 to the gateway device 102 via an out of band (OOB) communication path of a non-packet switched network (e.g., QAM network). As another example, the control device 104 can transmit the first request for the data asset to the computing device 103 via an infrared (IR) or radio frequency (RF) communication mechanism, and the computing device 103 can transmit the first request for the data asset to the gateway device 102 via an out of band (OOB) communication path (e.g., IP communication path) of the non-packet switched network.

At step 304, a second request for a data asset can be transmitted based on the first request. In an aspect, the gateway device 102 can interpret the first request for the data asset and form a second request for the data asset compatible with one or more requirements of the content provider 101. The second request for the data asset can comprise a title of the content (e.g., title of a television program or a movie), a type of content (e.g., pay per view content, video on demand content), channel information (e.g., channel 10), user account information, and/or the like. The gateway device 102 (e.g., packet switched network tuners 106) can access or receive the requested data asset by transmitting the second request for the data asset to the content provider 101.

At step 306, the requested content can be received via a packet switched network in response to the second request for the data asset. In an aspect, in response to receiving the second request for the data asset, the content provider 101 can select the requested content, such as content of requested title, a requested channel, a video on demand asset, a pay per view asset, and the like. The requested content can be transmitted to the gateway device 102 via a packet switched network. As an example, the packet switched network can comprise an hamlet protocol network. Thus, the requested content can be received by the gateway device 102 as a packetized data asset (e.g., IP packets, Ethernet frames).

At step 308, a non-packetized data asset can be generated based on the received packetized data asset. In an aspect, the gateway device 102 can be configured to convert the received packetized data asset to a non-packetized data asset. For example, when the packetized data assets are encrypted, the gateway device 102 (e.g., content processing element 108) can be configured to convert encryption of the received packetized data asset (e.g., interim protocol packets, Ethernet frames) to a conditional access security required by the computing device 103 (e.g., QAM enabled set top box). In another aspect, the gateway device 102 (e.g., content processing element 108) can be configured to defragment the received packetized data asset, and the defragmented packetized data asset can be formed as a continuous stream prior to a modulation process (e.g. QAM modulation process). In another aspect, the gateway device 102 (e.g., content processing element 108) can convert a content codec of the received packetized data assets to a content codec of the non-packetized data asset, for example, convert H.264 content codec to MPEG-2 content codec. In another aspect, the gateway device 102 (e.g., content processing element 108) can combine a plurality of packetized data assets (e.g., IP packets, Ethernet frames) and cache a sufficient quantity of packetized data assets to ensure a quantity of data for a continuous streaming source. In an aspect, the gateway device 102 can comprise a modulator to multiplex a plurality of non-packetized data assets in a single QAM channel.

At step 310, the non-packetized data assets can be transmitted via a non-packet switched network to a computing device. In an aspect, the gateway device 102 can transmit the non-packetized data asset to one or more computing devices 103 via a non-packet switched network. The non-packetized data asset can be transmitted to one or more computing devices 103 based on respective device identifiers (e.g., MAC addresses) associated with the one or more computing devices 103. As an example, the non-packetized data asset can comprise a plurality of data streams. In an aspect, each of the plurality of data steams can be transmitted to a specific computing device 103. As an example, the non-packet switched network can comprise one or more QAM networks. As an example, computing device 103 can comprise a set top box, a programmable consumer electronic device, a smart phone, a computer, a tablet, a mobile device, a PDA, a smart TV set, a vehicle entertainment system, a communications terminal or the like.

Figure 4:
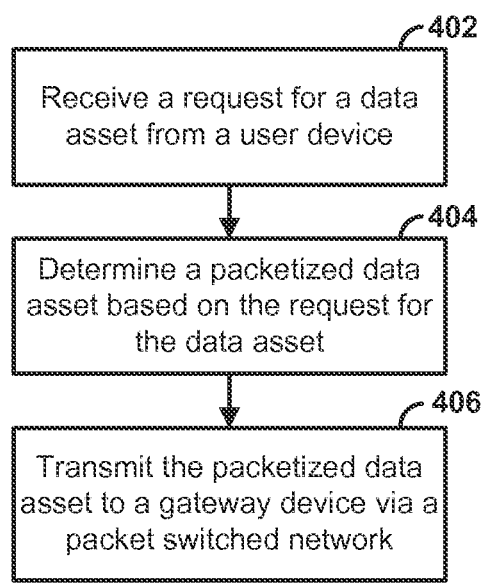
FIG. 4 is a flowchart illustrating another example method.

FIG. 4 is a flowchart illustrating yet another example method for tuning content. At step 402, a request for a data asset can be received. In an aspect, a request for a data asset can be received from a user device control device 104) via or at the content service system 105. In an aspect, the request for the data asset can comprise a request for content. For example, the request for content can comprise a title of the content (e.g., title of a television program or a movie), a type of content (e.g., pay per view content, video on demand content), channel information (e.g., channel 10), user account information, and/or the like. As another example, the first request for the data asset can comprise a device identifier of a device (e.g., computing device 103) to which the requested content can be transmitted. As an example, the content service system 105 can comprise a server for providing services. In an aspect, the content service system 105 can enable the control device 104 to interact with the content provider 101. As an example, content service system 105 can be a web application, a server, router, network computer, peer device, other common network node, and the like. In an aspect, the content service system 105 can communicate with the control device 104 and/or the content provider 101 over standard Internet protocols, such as hypertext transfer protocol (HTTP), simple object access protocol (SOAP), universal description, discovery and integration (UDDI), etc. As an example, the control device 104 can transmit a request for a data asset to the content provider 101 via the content service system 105. Upon receiving the request for the data asset, the content provider 101 can transmit the requested content to a computing device (e.g., computing device 103) via the gateway device 102.

At step 404, a packetized data asset can be determined based on the request for the data asset. In an aspect, upon receiving the request for the data asset, the content provider 101 can select the requested data asset, such as content of a requested title, a requested channel, a video on demand asset, a pay per view asset, and the like.

At step 406, the packetized data asset can be transmitted to a gateway device via a packet switched network, wherein the gateway device is configured to convert the packetized data asset to non-packetized data asset to facilitate transmission via a non-packet switched network. For example, the content provider 101 can transmit the determined packetized data asset to the gateway device 102 at a user network via a packet switched network (e.g., IP network). There can be a plurality of gateway devices 102 at a multitude of user networks (e.g., at multiple user locations) connected to the packet switched network. Accordingly, the content provider 101 can multicast and/or unicast the determined packetized asset to the gateway device 102. In an aspect, the content provider 101 can provide content to the gateway device 102 based on a device identifier (e.g., device identifier 109) associated with the gateway device 102.

In an aspect, the gateway device 102 (e.g., the content processing element 108) can be configured to convert the received packetized data asset to a non-packetized data asset. In an aspect, the content processing element 108 can combine a plurality packetized data assets and cache a sufficient quantity of packetized data assets to ensure a continuous streaming source. When the packetized data assets are encrypted, the gateway device 102 (e.g., content processing element 108) can be configured to convert encryption of received packetized data asset (e.g., internet protocol packets, Ethernet frames) to a conditional access security required by the computing device 103 (e.g., QAM enabled set top box). In another aspect, the gateway device 102 (e.g., content processing element 108) can be configured to defragment the received packetized data asset, and the defragmented packetized data asset can be formed as a continuous stream prior to performing a modulation process (e.g. QAM modulation process). In another aspect, the gateway device 102 (e.g., content processing element 108) can convert a content codec of the received packetized data assets to a content codec of the non-packetized data asset, for example, convert H.264 content codec to MPEG-2 content codec. In an aspect, the gateway device 102 (e.g., content processing element 108) can multiplex a plurality of non-packetized data assets in a single QAM channel. The packetized data asset can be transmitted to one or more computing devices 103 collocated with the gateway device 102 (i.e., the one or more computing devices 103 and the gateway device 102 connected to the same user network) based on a respective device identifier (e.g., device identifier 109) associated with the one or more computing devices 103.

Figure 5:
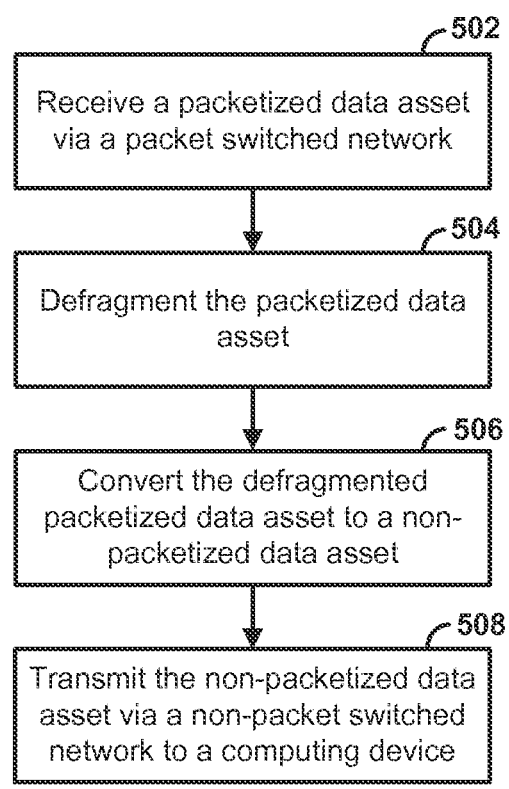
FIG. 5 is a flowchart illustrating another example method.

FIG. 5 is a flowchart illustrating another example method. At step 502, a packetized data asset can be transmitted (e.g., a unicast, multicast, or broadcast transmission, etc.) via a packet switched network to a user network which can be a network downstream of the gateway device 102, such as a user's private or public home network. In an aspect, the gateway device 102, located at the user network, can receive a packetized data asset from the content provider 101. The content provider 101 can transmit the packetized data asset to the gateway device 102 via a packet switched network by, for example, unicast, multicast, and/or broadcast transmission. For example, the gateway device 102 can receive the packetized data asset via joining a group multicast transmission. In an aspect, gateway device 102 can comprise a headless gateway system, a network device, a communication terminal, and/or the like. As an example, the packet switched network can comprise an internet protocol based network. The packetized data asset can comprise a plurality of units of data, such as internet protocol packets, Ethernet frames, and the like. The packetized data asset can comprise information associated with requested content or content channel.

At step 504, the gateway device 102 (e.g., content processing element 108) can be configured to defragment the received packetized data asset, and form the defragmented packetized data asset as a continuous stream prior to a modulation process (e.g. QAM modulation process). For example, the gateway device 102 can store the plurality of units of data (e.g., the plurality of internet protocol packets) that comprise the packetized data asset in a memory, such as the cache 117. Defragmenting the plurality of packets can comprise ordering the plurality of packets according to a predefined order. For example, the plurality of packets can be ordered in the cache 117 according to the order in which the packets were created and/or transmitted.

At step 506, the packetized data asset can be converted to a non-packetized data asset at the user premises (e.g., at the user network). In an aspect, the gateway device 102 (e.g., the content processing element 108) can be configured to convert the packetized asset to a non-packetized data asset. In an aspect, the content processing element 108 can combine a plurality packetized data assets and cache sufficient quantity of packetized data assets to ensure a continuous streaming source.

In an aspect, the packetized data asset can be encrypted, for example using a digital rights management (DRM) system. When the packetized data asset is encrypted, the gateway device 102 (e.g., content processing element 108) can be configured to convert encryption of received packetized data asset (e.g., Internet protocol packets, Ethernet flames) to a conditional access security required by the computing device 103 (e.g., QAM enabled set top box). As an example, the packetized data asset can be encrypted using a DRM system. The received packetized data asset can be stored in a memory, such as the cache 117. The content processing element 108 can be configured to authenticate the received packetized data asset. For example, the content processing element can authenticate the packetized data asset by communicating with a DRM server, such as a DRM server run by the content provider 101 or a third party DRM server. When the packetized content is authenticated, the content processing element 108 can convert the packetized data asset to a non-packetized data asset. Further, the data processing element 108 can convert the non-packetized data asset to securely transmit the non-packetized data asset. For example, the data processing element 108 can encrypt the non-packetized data asset using a conditional access security system in an aspect, the conditional access system can be used to scramble the non-packetized data asset in addition to or in place of the encryption.

In another aspect, the gateway device 102 (e.g., content processing element 108) can convert (e.g., transcode) content encoded with a codec of the received packetized data asset to content encoded with a codec of the non-packetized data asset, for example, content encoded with H.264 codec can be transcoded to MPEG-2 content codec. In an aspect, the content processing element 108 can comprise one or more modulators to modulate the converted non-packetized data asset according to a modulation technique (e.g., QAM). In another aspect, the content processing element 108 can perform one or more of decryption, defragmentation, transcoding, multiplexing, and modulation of the received packetized data asset. In another aspect, the content processing element 108 can select a specific video resolution and/or bit rate profiles from a packetized data set based on device capability of the computing device 103. In an aspect, the gateway device 102 (e.g., content processing element 108) can multiplex a plurality of non-packetized data assets in a single channel (e.g., QAM channel).

As an example, the gateway device 102 can receive a plurality of IP delivered media streams (e.g., video, audio, captioning data, and other content data) and convert the plurality of IP delivered media streams to a MPEG Transport Stream (TS) format. MPEG-TS can require an isochronous delivery. In an aspect, IP delivery of the data asset can be packetized (i.e., divided into a plurality of data blocks) at the rate of a delivery network. In this scenario, an IP data asset can arrive in bursts and can be formatted into a steady stream of data formatted as a non-packetized data asset transport stream. As an example, an IP delivered data asset format can comprise MPEG-DASH, Smooth Streaming, HTTP streaming, HTTP live streaming (HLS), and others that can be adapted to MPEG-TS format. The MPEG-TS stream can be converted to a non-packetized stream and modulated using QAM or a similar modulation method using a RE carrier prior to transmission to the computing device 103.

At step 508, the non-packetized data asset can be transmitted via a non-packet switched network to a computing device, based on a device identifier associated with the computing device. In an aspect, the device identifier can be transmitted to the gateway device 102 from a computing device 103 as part of a request for a data asset to begin a session. In an aspect, the device identifier can comprise, for example, a media access control (MAC) address of the computing device 103. In an aspect, the gateway device 102 assigns a channel (e.g., a QAM channel) to the computing device 103 in response to receiving the device identifier and transmits a channel identifier identifying the assigned channel to the computing device 103. In an aspect, the gateway device 102 can also assign a program identifier to the computing device 103 and can transmit the program identifier to the computing device 103. The channel and program identifier can be maintained for the duration of a session. In an aspect, the gateway device 102 can transmit the non-packetized data asset to one or more computing device 103 via a non-packet switched network. The non-packetized data asset can be transmitted to one or more computing devices 103 based on device identifiers (e.g., MAC addresses) associated with the respective one or more computing devices 103. As an example, the non-packetized data asset can comprise a plurality of data streams. In an aspect, each of the plurality of data steams can be transmitted to a specific computing device 103. For example, the non-packet switched network can comprise one or more QAM networks. The computing device 103 can be assigned a particular QAM channel and program identifier, and the gateway device 102 can transmit a respective one of the data streams to the computing device 103 by transmitting the respective data stream on the assigned QAM channel. Optionally, the data stream can be further associated with the device identifier of the computing device 103. For example, one or more frames in an MPEG-2 encoded data stream can be embedded with the device identifier. As another example, QAM native out of band communication within the data stream can be used to indicate the device identifier of the computing device 103. As an example, the computing device 103 can comprise a set top box, a programmable consumer electronic device, a smart phone, a computer, a tablet, a mobile device, a PDA, a smart TV set, an entertainment system, a communications terminal, and the like. The computing device 103 can use the QAM channel identifier and/or the program identifier provided by the gateway device 102 to tune to the assigned QAM channel for display of the requested data asset.

Figure 6:
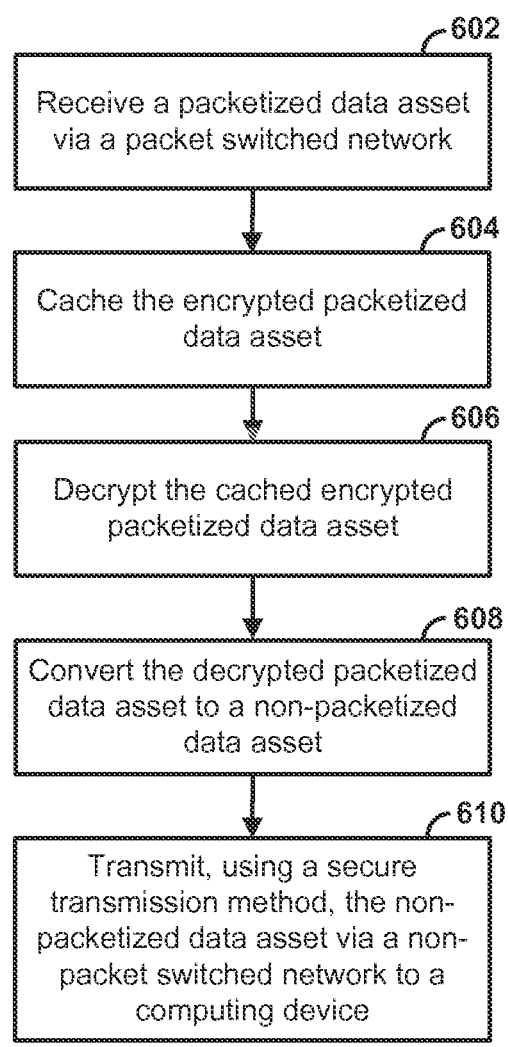
FIG. 6 is a flowchart illustrating another example method.

FIG. 6 is a flowchart illustrating another example method. At step 602, an encrypted packetized data asset can be transmitted (e.g., a unicast, multicast, or broadcast transmission, etc.) via a packet switched network to a user network which can be a network downstream of the gateway device 102, such as a user's private or public home network. In an aspect, the gateway device 102, located at the user network, can receive an encrypted packetized data asset from the content provider 101. The content provider 101 can transmit the encrypted packetized data asset to the gateway device 102 via a packet switched network by, for example, unicast, multicast, and/or broadcast transmission. For example, the gateway device 102 can receive the encrypted packetized data asset via joining a group multicast transmission. In an aspect, gateway device 102 can comprise a headless gateway system, a network device, a communication terminal, and/or the like. As an example, the packet switched network can comprise an internet protocol based network. The encrypted packetized data asset can comprise a plurality of units of data, such as internet protocol packets, Ethernet frames, and the like. The encrypted packetized data asset can comprise information associated with requested content or content channel. In an aspect, the encrypted packetized data asset can be encrypted using, for example, a digital rights management (DRM) system. Alternatively, other known encryption methods can be used to encrypt the encrypted packetized data asset.

At step 604, the encrypted packetized data can be cached. In an aspect, the gateway device 102 can store at least a portion of the encrypted packetized data asset in a memory, such as the cache 117. As an example, packets of the encrypted packetized data asset can be stored in the memory as it is received at the gateway device 102.

At step 606, the cached encrypted packetized data asset can be decrypted. The gateway device 102 can store the encrypted packetized data asset in a memory, such as the cache 117. The content processing element 108 can be configured to decrypt the received packetized data asset using a decryption scheme that matches the encryption of the data asset. For example, the content processing element can authenticate a DRM-encrypted packetized data asset by communicating with a DRM server, such as a DRM server run by the content provider 101 or a third party DRM server.

At step 608, the decrypted packetized data asset can be converted to a non-packetized data asset at the user premises (e.g., at the user network). In an aspect, the gateway device 102 (e.g., the content processing element 108) can be configured to convert the packetized asset to a non-packetized data asset. In an aspect, the content processing element 108 can combine a plurality packetized data assets and cache sufficient quantity of packetized data assets to ensure a continuous streaming source.

In another aspect, the gateway device 102 (e.g., content processing element 108) can be configured to defragment the received packetized data asset, and form the defragmented packetized data asset as a continuous stream prior to a modulation process (e.g. QAM modulation process). For example, the gateway device 102 can store the plurality of units of data (e.g., the plurality of internee protocol packets) that comprise the packetized data asset in a memory, such as the cache 117. Defragmenting the plurality of packets can comprise ordering the plurality of packets according to a predefined order. For example, the plurality of packets can be ordered in the cache 117 according to the order in which the packets were created and/or transmitted.

In another aspect, the gateway device 102 (e.g., content processing element 108) can convert (e.g., transcode) content encoded with a codec of the received packetized data asset to content encoded with a codec of the non-packetized data asset, for example, content encoded with H.264 codec can be transcoded to MPEG-2 content codec. In an aspect, the content processing element 108 can comprise one or more modulators to modulate the converted non-packetized data asset according to a modulation technique (e.g., QAM). In another aspect, the content processing element 108 can perform one or more of decryption, defragmentation, transcoding, multiplexing, and modulation of the received packetized data asset. In another aspect, the content processing element 108 can select a specific video resolution and/or bit rate profiles from a packetized data set based on device capability of the computing device 103. In an aspect, the gateway device 102 (e.g., content processing element 108) can multiplex a plurality of non-packetized data assets in a single channel (e.g., QAM channel).

As an example, the gateway device 102 can receive a plurality of IP delivered media streams (e.g., video, audio, captioning data, and other content data) and convert the plurality of IP delivered media streams to a MPEG Transport Stream (TS) format. MPEG-TS can require an isochronous delivery. In an aspect, IP delivery of the data asset can be packetized (i.e., divided into a plurality of data blocks) at the rate of a delivery network. In this scenario, an IP data asset can arrive in bursts and can be formatted into a steady stream of data formatted as a non-packetized data asset transport stream. As an example, an IP delivered data asset format can comprise MPEG-DASH, Smooth Streaming, HTTP streaming, HTTP live streaming (HLS), and others that can be adapted to MPEG-TS format. The MPEG-TS stream can be converted to a non-packetized stream and modulated using QAM or a similar modulation method using a RE carrier prior to transmission to the computing device 103.

At step 610, the non-packetized data asset can be securely transmitted via a non-packet switched network to a computing device, based on a device identifier associated with the computing device. In an aspect, the gateway device 102 (e.g., content processing element 108) can effect secure transaction of the non-packetized data asset using a conditional access security required by the computing device 103 (e.g., QAM enabled set top box). For example, the data processing element 108 can encrypt the non-packetized data asset using a conditional access security system. In an aspect, the conditional access system can be used to scramble the non-packetized data asset in addition to or in place of the encryption.

In an aspect, the device identifier can be transmitted to the gateway device 102 from a computing device 103 as part of a request for a data asset to begin a session in an aspect, (he device identifier can comprise, for example, a media access control (MAC) address of the computing device 103. In an aspect, the gateway device 102 assigns a channel (e.g., a QAM channel) to the computing device 103 in response to receiving the device identifier and transmits a channel identifier identifying the assigned channel to the computing device 103. In an aspect, the gateway device 102 can also assign a program identifier to the computing device 103 and can transmit the program identifier to the computing device 103. The channel and program identifier can be maintained for the duration of a session. In an aspect, the gateway device 102 can transmit the non-packetized data asset to one or more computing device 103 via, a non-packet switched network. The non-packetized data asset can be transmitted to one or more computing devices 103 based on device identifiers (e.g., MAC addresses) associated with the respective one or more computing devices 103. As an example, the non-packetized data asset can comprise a plurality of data streams. In an aspect, each of the plurality of data steams can be transmitted to a specific computing device 103. For example, the non-packet switched network can comprise one or more QAM networks. The computing device 103 can be assigned a particular QAM channel and program identifier, and the gateway device 102 can transmit a respective one of the data streams to the computing device 103 by transmitting the respective data stream on the assigned QAM channel. Optionally, the data stream can be further associated with the device identifier of the computing device 103. For example, one or more frames in an MPEG-2 encoded data stream can be embedded with the device identifier. As another example, QAM native out of band communication within the data stream can be used to indicate the device identifier of the computing device 103. As an example, the computing device 103 can comprise a set top box, a programmable consumer electronic device, a smart phone, a computer, a tablet, a mobile device, a PDA, a smart TV set, an entertainment system, a communications terminal, and the like. The computing device 103 can use the QAM channel identifier and/or the program identifier provided by the gateway device 102 to tune to the assigned QAM channel for display of the requested data asset.

Figure 7:
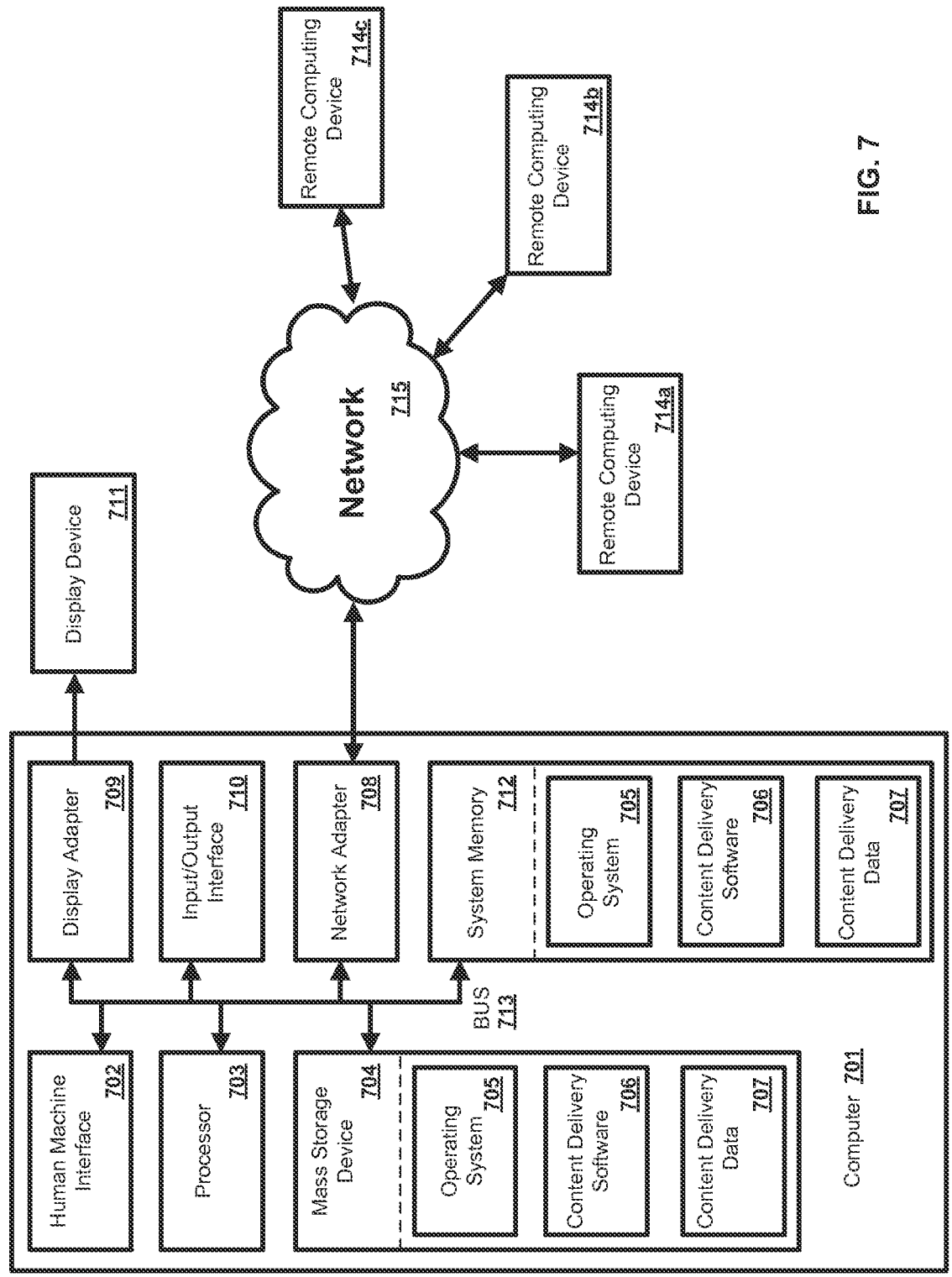
FIG. 7 is a block diagram illustrating an example computing device.

In an exemplary aspect, the methods and systems can be implemented on a computer 701 as illustrated in FIG. 7 and described below. By way of example, the computer 701 as illustrated in FIG. 7 can be gateway device 102, computing device 103, control device 104, or content service system 105 of FIG. 1. As another example, the remote computing devices 714*a,b,c* in FIG. 7 can be gateway device 102, computing device 103, control device 104, content service system 105. Similarly, the methods and systems disclosed can utilize one or more computers to perform one or more functions in one or more locations. FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 701. The components of the computer 701 can comprise, but are not limited to, one or more processors 703, a system memory 712, and a system bus 713 that couples various system components including the processor 703 to the system memory 712. In the case of multiple processors 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processor 703, a mass storage device 704, an operating system 705, content tuning software 706, content tuning data 707, a network adapter 708, system memory 712, an Input/Output Interface 710, a display adapter 709, a display device 711, and a human machine interface 702, can be contained within one or more remote computing devices 714*a,b,c* at physically separate locations, connected through buses of this form, in effect implementing a fully distributed system.

The computer 701 typically comprises a variety of computer readable media. Exemplary readable media can be any available media that is accessible by the computer 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as content tuning data 707 and/or program modules such as operating system 705 and content tuning software 706 that are immediately accessible to and/or are presently operated on by the processor 703.

In another aspect, the computer 701 can also comprise other removable/non-removable, volatile/non-volatile computer storage media. By way of example, FIG. 7 illustrates a mass storage device 704 which can provide non-volatile storage of computer code, computer readable instructions, data structures, program modules, and other data for the computer 701. For example and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and content delivering software 706. Each of the operating system 705 and content delivering software 706 (or some combination thereof) can comprise elements of the programming and the content delivering software 706. Content delivering data 707 can also be stored on the mass storage device 704. Content delivering data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processor 703 via a human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, a display device 711 can also be connected to the system bus 713 via an interface, such as a display adapter 709. It is contemplated that the computer 701 can have more than one display adapter 709 and the computer 701 can have more than one display device 711. For example, a display device can be a monitor, an LCD (Liquid Crystal Display), or a projector. In addition to the display device 711, other output peripheral devices can comprise components such as speakers (not shown) and a printer (not shown) which can be connected to the computer 701 via Input/Output Interface 710. Any step and/or result of the methods can be output in any form to an output device. Such output can be any form of visual representation, including, but not limited to, textual, graphical, animation, audio, tactile, and the like. The display 711 and computer 701 can be part of one device, or separate devices.

The computer 701 can operate in a networked environment using logical connections to one or more remote computing devices 714a,b,c. By way of example, a remote computing device can be a personal computer, portable computer, smartphone, a server, a router, a network computer, a peer device or other common network node, and so on. Logical connections between the computer 701 and a remote computing device 714a,b,c can be made via a network 715, such as a local area network (LAN) and/or a general wide area network (WAN). Such network connections can be through a network adapter 708. A network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing device 701, and are executed by the data processor(s) of the computer. An implementation of content delivering software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning. Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow;

plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
receiving, by a gateway device, a request for a data asset, wherein the request comprises a device identifier of a computing device;
determining, based on the device identifier, that the computing device is configured to communicate via a non-packet switched network;
retrieving, via a packet switched network, based on determining that the computing device is configured to communicate via the non-packet switched network, a packetized version of the data asset, wherein the packetized version of the data asset comprises a plurality of encrypted packets;
decrypting the plurality of encrypted packets;
determining that a quantity of the plurality of decrypted packets in a cache associated with the gateway device satisfies a threshold;
scrambling, based on determining that the quantity of the plurality of decrypted packets in the cache satisfies the threshold, a non-packetized version of the data asset; and
sending, via the non-packet switched network, the scrambled non-packetized version of the data asset.

2. The method of claim 1, wherein the plurality of encrypted packets are retrieved from a source of a plurality of sources, and the method further comprises:
generating, based on an order of the plurality of encrypted packets, the packetized version of the data asset; and
converting the packetized version of the data asset to the non-packetized version of the data asset.

3. The method of claim 1, wherein the non-packet switched network comprises a Quadrature Amplitude Modulation (QAM) network, and wherein the packet switched network comprises an Internet Protocol (IP) network.

4. The method of claim 1, wherein the non-packetized version of the data asset comprises a plurality of data streams.

5. The method of claim 2, wherein converting the packetized version of the data asset to the non-packetized version of the data asset comprises decrypting the packetized version of the data asset.

6. The method of claim 2, wherein converting the packetized version of the data asset to the non-packetized version of the data asset comprises modulating the packetized version of the data asset.

7. A method comprising:
receiving, by a gateway device, a request for a data asset, wherein the request comprises a device identifier of a computing device;
determining, based on the device identifier, that the computing device is configured to communicate via a non-packet switched network;
requesting, based on determining that the computing device is configured to communicate via the non-packet switched network, from a plurality of sources via a packet switched network, encrypted portions of the data asset;
decrypting, based on a quantity of the encrypted portions of the data asset received responsive to the request, from one or more sources of the plurality of sources, via the packet switched network, satisfying a threshold, the encrypted portions of the data asset;
generating, based on decrypting the encrypted portions of the data asset, a decrypted packetized version of the data asset;
converting the decrypted packetized version of the data asset to a non-packetized version of the data asset;
scrambling the non-packetized version of the data asset; and
sending, to the computing device, via the non-packet switched network, the scrambled non-packetized version of the data asset.

8. The method of claim 7, wherein the non-packetized version of the data asset comprises a plurality of data streams.

9. The method of claim 7, wherein the non-packet switched network comprises a Quadrature Amplitude Modulation (QAM) network and the packet switched network comprises an Internet Protocol (IP) network.

10. The method of claim 7, wherein the non-packetized version of the data asset is associated with a Conditional Access (CA) service.

11. The method of claim 7, wherein decrypting the encrypted portions of the data asset comprises authenticating the encrypted portions of the data asset using a digital rights management server.

12. The method of claim 7, wherein converting the decrypted packetized version of the data asset to the non-packetized version of the data asset comprises modulating the decrypted packetized version of the data asset.

13. A method comprising:
receiving, by a gateway device, a request for a data asset, wherein the request comprises a device identifier of a computing device;
determining, based on the device identifier, that the computing device is configured to communicate via a non-packet switched network;
retrieving, based on determining that the computing device is configured to communicate via the non-packet switched network, via a unicast transmission and a packet switched network, a packetized version of the data asset, wherein the packetized version of the data asset comprises a plurality of encrypted packets;
decrypting the plurality of encrypted packets;
ordering, based on a quantity of the plurality of decrypted packets in a cache satisfying a threshold and a data defined order, the plurality of decrypted packets to create an ordered packetized version of the data asset;
converting the ordered packetized version of the data asset to a non-packetized version of the data asset;
scrambling the non-packetized version of the data asset; and
sending, via the non-packet switched network, to the computing device, the scrambled non-packetized version of the data asset.

14. The method of claim 13, wherein the packet switched network comprises an Internet protocol (IP) network.

15. The method of claim 13, wherein the non-packet switched network comprises a QAM network.

16. The method of claim 13, wherein the non-packetized version of the data asset comprises a plurality of data streams.

17. The method of claim 13, wherein converting the ordered packetized version of the data asset to the non-packetized version of the data asset comprises transcoding the ordered packetized version of the data asset.

18. The method of claim 13, wherein converting the ordered packetized version of the data asset to the non-packetized version of the data asset comprises multiplexing the ordered packetized version of the data asset.

19. The method of claim 13, wherein converting the ordered packetized version of the data asset to the non-packetized version of the data asset comprises modulating the ordered packetized version of the data asset.

20. The method of claim 13, wherein converting the ordered packetized version of the data asset to the non-packetized version of the data asset comprises decrypting the ordered packetized version of the data asset.

* * * * *